United States Patent [19]

Dean

[11] Patent Number: 4,641,375

[45] Date of Patent: Feb. 3, 1987

[54] LOCAL AREA NETWORK

[75] Inventor: Andrew Dean, Stansted, England

[73] Assignee: International Standard Electric Corporation, New York, N.Y.

[21] Appl. No.: 708,995

[22] Filed: Mar. 7, 1985

[30] Foreign Application Priority Data

Mar. 8, 1984 [GB] United Kingdom ............... 8406077

[51] Int. Cl.$^4$ ............................ H04B 9/00; H04J 1/02
[52] U.S. Cl. ...................................... 455/607; 455/69; 370/74
[58] Field of Search ............... 455/606, 607, 612, 619, 455/69, 307; 350/96.16; 370/74, 98

[56] References Cited

U.S. PATENT DOCUMENTS

| 2,924,703 | 2/1960 | Sichak et al. | 455/69 |
|---|---|---|---|
| 3,315,164 | 4/1967 | Ferguson, Jr. et al. | 455/69 |
| 3,325,600 | 6/1967 | Fierston et al. | 370/74 |
| 4,234,968 | 11/1980 | Singh | 350/96.16 |
| 4,317,235 | 2/1982 | Tsukada | 320/98 |
| 4,562,582 | 12/1985 | Tokura et al. | 455/619 |

FOREIGN PATENT DOCUMENTS 57-174947 10/1982 Japan ............................ 455/307

Primary Examiner—Robert L. Griffin
Assistant Examiner—Andrew J. Telesz, Jr.
Attorney, Agent, or Firm—John J. O'Halloran; Thomas F. Meagher

[57] ABSTRACT

In a local area network (LAN), of the Ethernet type, one of the segments, i.e. one bus, is replaced by a star coupler connected via optical fibre pairs to a number of stations. Each pair includes a GO fibre and a RETURN fibre. As in the usual Ethernet system, collision detection relies on measuring signal level on the medium, if it is too large then a collision condition exists.

In an optical fibre system a similar collision detection technique is used. To detect collision, it is nescessary to be aware of the network's attenuation as "seen" by the station. To do this a low level pilot tone is sent from each station, each station having its own tone frequency. The amplitude of this tone when it returns to its own station indicates the system's attenuation, and this is used to detect collision.

In an alternative the pilot signals are pseudo-random bit sequences.

3 Claims, 3 Drawing Figures

LOCAL AREA NETWORK

BACKGROUND OF THE INVENTION

This invention relates to a local area network (LAN) in which part at least of the network uses optical fibres as the data transmission medium.

In a local area network of the Ethernet type, which is one of the best established LAN standards, collisions, i.e. the condition which results when two or more of the system's nodes attempt to transmit at the same time, are usually detected by monitoring the signal level on the transmission medium. In the case of a metallic medium this involves monitoring the voltage level, whereas in the case of an optical fibre medium it involves monitoring the light level on the medium. To do this some indication of the attenuation condition needs to be obtained. This invention has as its object the provision of an arrangement for making such attenuation determination in respect of a system using an optical fibre medium.

SUMMARY OF THE INVENTION

According to the present invention there is provided an optical fibre transmission system, which includes optical transceiver stations each having its transmitter coupled via a length of optical fibre to a star coupler and its receiver coupled via another length of optical fibre to the star coupler, so that with n stations there are 2n lengths of optical fibre coupled to the star coupler, wherein each said station includes means to generate a pilot signal specific to that station, which pilot signal is transmitted at a level which is low compared with the level used for data transmission, and wherein means in each said station receives its said pilot signal after it has passed from the station's transmitter via one length of optical fibre to the star coupler and from that star coupler via another length of optical fibre to the station's receiver, the level of the pilot signal being monitored on reception so that the attenuation to which signals conveyed via the system is monitored.

BRIEF DESCRIPTION OF THE DRAWINGS

An embodiment of the invention will now be described with reference to the accompanying drawings, in which.

DESCRIPTION OF THE PREFERRED EMBODIMENTS

Figure 1:
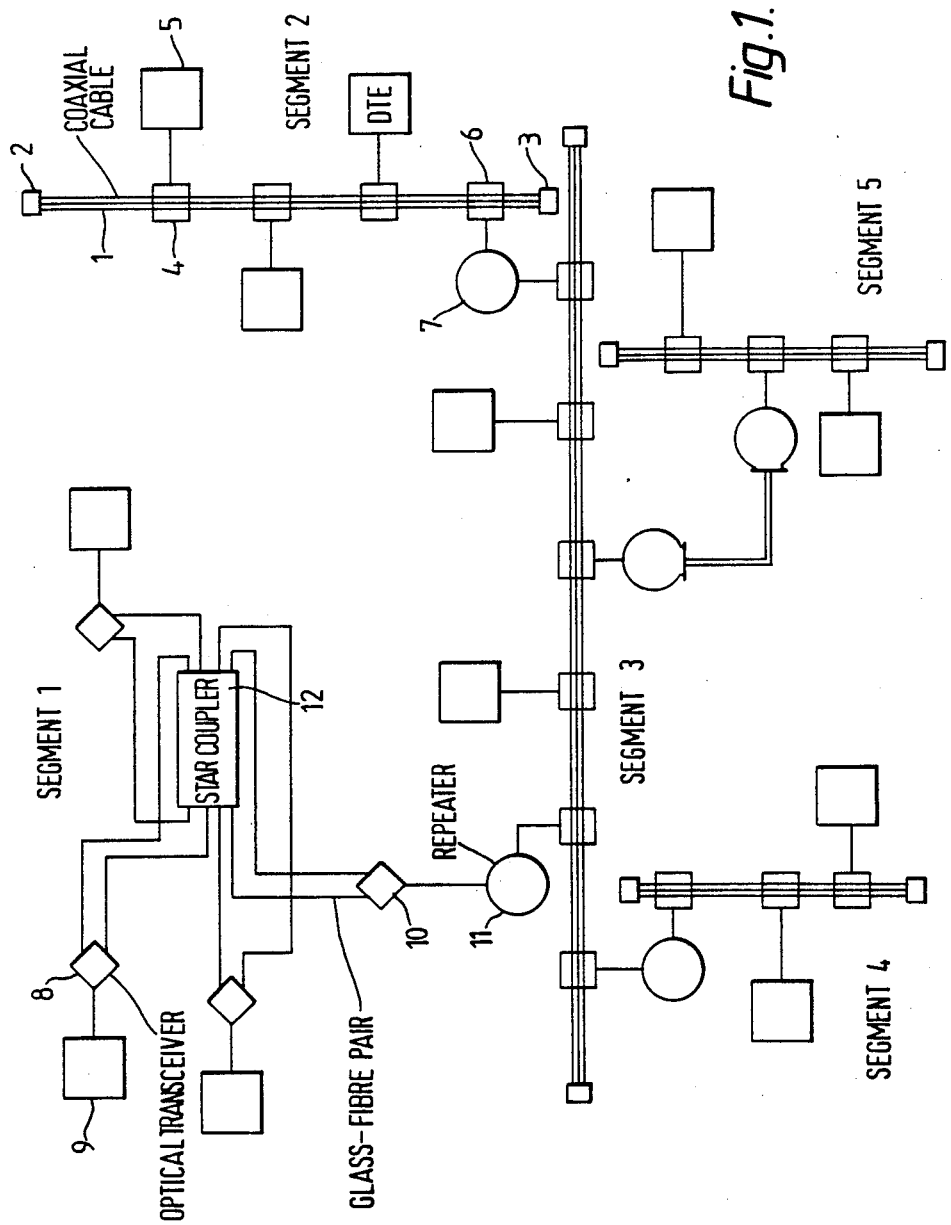
FIG. 1 shows schematically a LAN of the Ethernet type with one of its segments replaced by optical fibres.

The present invention is described as applied to a LAN of the Ethernet type, as shown in FIG. 1. The Ethernet system is of the bus type, i.e. the transmission medium is a bus, usually of coaxial cable which is terminated at each end to avoid reflections. The terminals served are connected to a number of nodes each connected to the bus. These nodes, each of which may serve two or more terminals are also called Medium Access Units, or MAUs.

When two or more MAUs wish to transmit a collision condition exists; when this is detected, all such attempts are cancelled and the MAUs try again after delays which may differ at different MAUs. This usually results in one MAU obtaining sole access to the medium. The collision detection is usually effected on the basis of monitoring the voltage level on the bus; if it is above a preset threshold it is assumed that a collision condition exists. It will be appreciated that the level of attenuation present on the bus can make the collision detection marginal in some cases.

Referring to FIG. 1, we see in schematic form an Ethernet type system which has five segments, one of which is formed by fibre optic elements. Considering the other segments, segment 2 will be briefly described. This has a coaxial cable bus 1, terminated at 2 and 3, usually resistively, to prevent reflection. A number of MAUs such as 4 are connected to the bus 1, and as shown each MAU serves one digital termination equipment (DTE) such as 5. As already mentioned, a MAU may serve more than one DTE. One MAU, 6, is coupled via a repeater 7 to another segment, in this case segment 3.

We now consider segment 1, in which the coaxial cable has been replaced by fibre optics. Here we have a number of optical transceivers such as 8 each serving one DTE such as 9. One optical transceiver, 10, is connected to a repeater 11 between segments 1 and 3. All of the optical transceivers are coupled to an optical star coupler 12, in each case by a glass fibre pair. Each glass fibre pair has a "GO" fibre and a "RETURN" fibre, and the star coupler when it receives a signal over a GO fibre shares that signal equally over all RETURN fibres. Collision detection relies on the detection of the level of light in the optical fibres, and this level, which is monitored in the RETURN fibre, depends on the attenuation present therein. As the fibres are not all the same length, it will be seen that attenuation is likely to vary from transceiver to transceiver. Hence as collision detection depends on an assessment of the light level, it is desirable for the transceiver to "know" the attenuation on its own fibres.

To enable the attenuation to be measured, each transceiver emits a low-level pilot tone, with each transceiver having its own frequency for that tone. In the present system, each pilot tone is a square wave whose frequency is in the range 20 KHz to 40 KHz, and its amplitude is 0.5% of the data level. Thus while it is readily detectable it is not large enough to interfere with the data level. To avoid drift in the demodulation circuitry the pilot tone is gated on and off once per second to allow clamping of the demodulated output.

The light emitting diode (LED) used in the optical transmitter is operated in a region of its transfer characteristic where the non-linearity is small enough and constant enough to allow a constant correction factor to adequately compensate for it. Hence a small direct current is added to the LED drive.

As the transmitter of the transceiver can guarantee within specified limits the ratio of pilot power to data signal power, the receiver has to be able to measure the pilot power accurately under the following conditions:
 (a) its own pilot signal only
 (b) pilot signals from all transmitters continuously
 (c) all pilot signals plus a data transmission
 (d) all pilot signals plus a collision
 (e) all pilot signals plus a multiple collision.

We next consider the linearity of the receiver, and in fact optical receivers which are sufficiently linear are available. Provided that the received data signals remain below a certain power level, collision between pairs of transmissions remain undistorted by the receiver, and the superimposed data signals also remain undistorted. However, if multiple collisions occur and the receiver saturates, care is taken to temporarily ignore the small pilot signal level until the collisions cease. Hence under most conditions the receiver remains linear, and the amplitude of each pilot tone remains constant under those conditions of signalling on the network.

Each receiver has access to its own pilot source, which permits synchronous demodulation of the returning pilot signal. This is useful since, due to attenuation, that returning pilot signal's amplitude may be smaller than the receiver's noise level. Care is taken to allow for phase shift of the pilot tone between the transmitter and receiver due to the optical path travelled by that tone.

Figure 2:
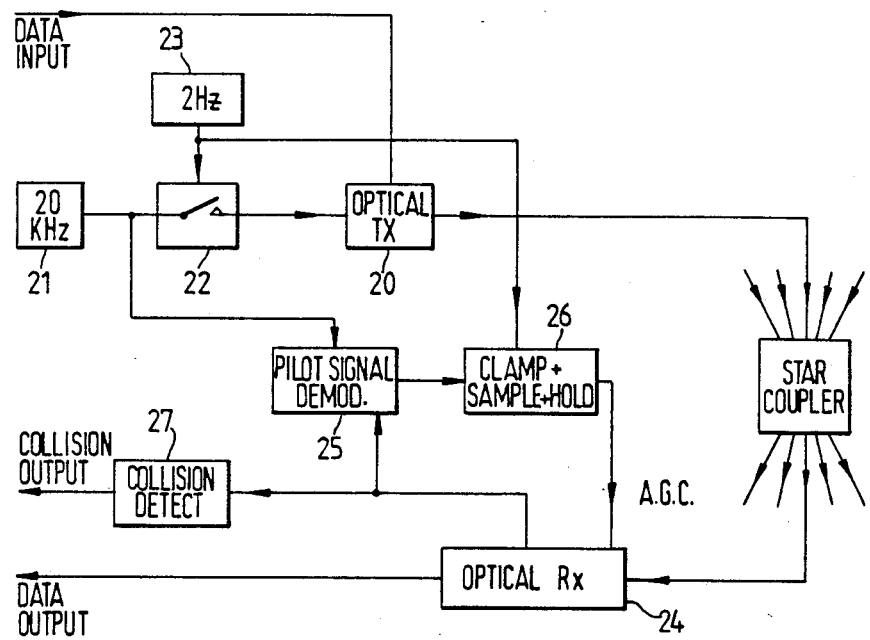
FIG. 2 shows as much of one of the nodes or Medium Access Units (MAUs) as is relevant to the invention.

We now refer to FIG. 2, which is a block schematic of part of one of the optical transceivers on the optical fibre segment of FIG. 1. The data input is applied to the optical transmitter 20 where it modulates the output of the LED in the transmitter. This output is applied via the transceiver's GO fibre to the star coupler, which shares it equally over the RETURN fibres of all transceivers.

In the example shown, the low-level pilot tone has a frequency of 20 KHz, and is applied from the tone generator 21 (in electrical form, of course) via an on-off switch 22 operated at 2 Hz by a source 23 of 2 Hz square waves. With a synchronous demodulator for the pilot tone, see below, this avoids drift in the multiplier used to demodulate the pilot tone, to allow clamping at the multiplier output. This pilot tone also modulates the transmitter 20 from which it passes out of the transceiver.

The light incoming to the transceiver reaches the optical receiver 24, where it falls on a photodiode or phototransistor, and from which the data is demodulated for transmission via the data output to the associated DTE.

In the optical transmitter, the data is applied to the base of a transistor whose emitter-collector path is in series with the transmitter's LED. Hence the current in the LED, and thus the light which it emits, is modulated. The pilot tone is injected to a point between the LED and the transistor, and a bias resistor is connected across the transistor to make the transfer characteristic of the transmitter more linear.

The pilot tone is applied to a pilot signal demodulator 25 as a reference input therefor. The demodulator 25 also receives the reference signal from the analogue output of the receiver 24, and its output is applied to a clamp and sample and hold circuit 26, which generates an automatic gain control signal (AGC) which is applied to the optical receiver 24. This ensures that the receiver always operates at its optimum gain, and allows a fixed threshold detector to be used to detect collisions (see below).

The optical receiver 24, in addition to the data output, produces the analogue output referred to above, which is representative of the overall light signals reaching it via the medium. This signal, with its gain adjusted via the demodulators as already indicated, is applied to the collision detector 27. Hence the input to the collision detector 27 enables the latter to "see" the level of attenuation on the medium as a result of a comparison of a fixed collision threshold level, and the signal after its traversal of the medium. Hence if the detector detects an excessive voltage level, which indicates that there is a collision condition, a collision output is produced. This, by means not shown, stops the data transmission attempt and causes it to start after a calculated delay. If the collision detector "realises" that the collision condition is due to a multiple collision, as indicated by the receiver approaching saturation, the small pilot signal level, which is then erroneously small is ignored by the receiver until collisions cease.

Thus by using a low level pilot tone at each transmitter, the associated receiver can adjust its gain so that the high level data signal from the transmitter produces a known output voltage level. If the data signal exceeds that level by more than, say, 50%, the collision threshold is exceeded, and an error signal is generated. However, no information is available at the receiver as to the optical power level at the star coupler. In some cases it is possible to assume that the attenuation on the path to the coupler is the same as that returning from it, but this assumption can in some cases lead to several dB's of error when all possible variables are taken into account.

Figure 3:
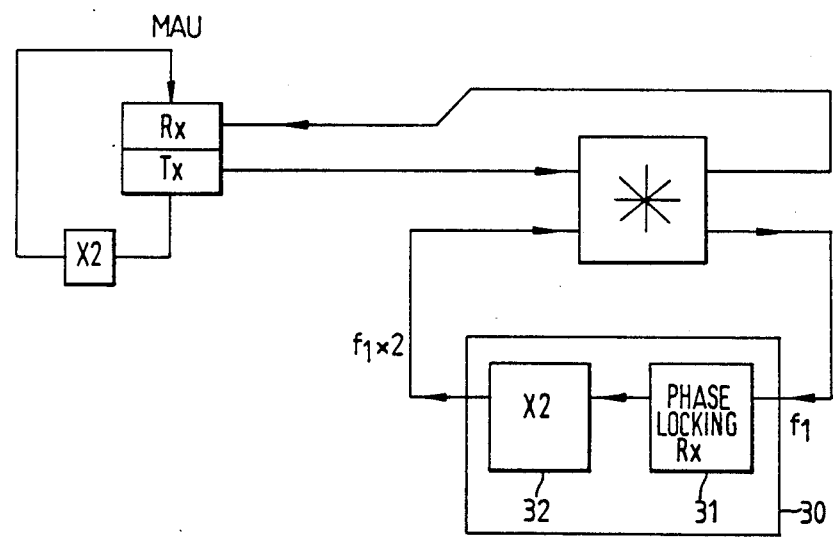
FIG. 3 shows an arrangement for producing a reference signal, usable for calibration purposes.

To ensure the best possible match of power levels at the star coupler is provided, two pilot tone frequencies are allocated to calibration of the MAUs. Any MAU can use these when requesting calibration. This is effected as shown in FIG. 3, which shows one MAU connected to the star coupler, and also the arrangement for using the pilot tones for calibration. Here we have a reference-level generator, which includes a phase locking receiver coupled to the star coupler. The calibrate frequency to be used is sent from the MAU which requests calibration, e.g. by the installer depressing a calibration button, and is received at the reference level generator 30, via the star coupler. This frequency $f_i$ is applied via a phase-locking receiver 31 to a frequency doubler whose output is applied to the fibre to the star coupler. Hence it arrives at the "calling" MAU where its level is received and detected providing the reference level to be used by that receiver.

The receiver in the MAU synchronously demodulates the returning signal, and the gain of the MAU's transmitter is so adjusted as to produce the same return signal as the reference level. This is achieved by alternately sending the "calibrate" pilot tone and the MAU's own stabilizing tone while calibration is in progress.

The need to differentiate between the pilot signals from each of the MAUs is achieved in the system described above by allocating an unique frequency to each MAU. An alternative method is to allocate mutually exclusive pseudo-random sequences to the MAUs. This spreads the spectral power of each pilot transmission over a wider bandwidth. Pilot signal recovery at the MAUs is achievable by a similar process of synchronous demodulation to that used with the pilot tones. However, in this case the phase of the sequence relative to the reference signal can be inverted rather than using the blanking technique referred to above. This would halve the gain needed in the pilot demodulator. This would, however, be more complex than would a system using pilot tones.

I claim:

1. An optical fibre transmission system, which includes optical transceiver stations each having its transmitter coupled via a length of optical fibre to a star coupler and its receiver coupled via another length of optical fibre to the star coupler, so that with n stations there are 2n lengths of optical fibre coupled to the star coupler, wherein each said station includes means to generate a pilot signal specific to that station, which pilot signal is transmitted at a level which is low compared with the level used for data transmission, and wherein means in each said station receives its said pilot signal after it has passed from the station's transmitter via one length of optical fibre to the star coupler and from that star coupler via another length of optical fibre to the station's receiver, the level of the pilot signal being monitored on reception so that the attenuation to which signals conveyed via the system is monitored, wherein the pilot signal is a tone which is transmitted at a level which is low compared with that of data signals, e.g. of an amplitude 0.5% of a data signal, and wherein each said station connected to the star coupler is allocated its own tone frequency, further comprising:

a reference signal generator coupled by optical fibres to the star coupler which includes means, responsive to a calibration request from a said station sending a first reference signal, for emitting a signal at twice the frequency of the signal which it received, and means at the said station to measure the signal level, and to adjust the station, on the basis of that level.

2. A system as claimed in claim 1, wherein the optical receiver at a said station has its gain so adjusted, under control of the attenuation monitoring, that it operates under optimum gain conditions.

3. A system as claimed in claim 1, and wherein the pilot signals are pseudo-random digital sequences.

* * * * *